US012761073B2

(12) United States Patent
Liu et al.

(10) Patent No.: US 12,761,073 B2
(45) Date of Patent: Oct. 13, 2026

(54) OPTICAL SENSING DEVICE AND METHOD FOR MANUFACTURING THE SAME

(71) Applicant: Taiwan-Asia Semiconductor Corporation, Hsinchu City (TW)

(72) Inventors: Yu-Hsin Liu, Hsinchu City (TW); Guo-Quan Wu, Hsinchu City (TW); Chia-Jung Chia, Hsinchu City (TW)

(73) Assignee: TAIWAN-ASIA SEMICONDUCTOR CORPORATION, Hsinchu City (TW)

( * ) Notice: Subject to any disclaimer, the term of this patent is extended or adjusted under 35 U.S.C. 154(b) by 95 days.

(21) Appl. No.: 18/636,839

(22) Filed: Apr. 16, 2024

(65) Prior Publication Data

US 2025/0130100 A1 Apr. 24, 2025

(30) Foreign Application Priority Data

Oct. 20, 2023 (TW) ................................ 112140311

(51) Int. Cl.
*G01J 1/04* (2006.01)
*G01J 1/42* (2006.01)

(52) U.S. Cl.
CPC .......... *G01J 1/0407* (2013.01); *G01J 1/0488* (2013.01); *G01J 1/429* (2013.01)

(58) Field of Classification Search
CPC ........ G01J 1/0407; G01J 1/0488; G01J 1/429; G01J 1/0214; H10F 30/223; H10F 77/331
See application file for complete search history.

(56) References Cited

U.S. PATENT DOCUMENTS

2017/0256658 A1* 9/2017 Tsukagoshi ....... H01L 23/49838
2019/0353833 A1 11/2019 Lin et al.
2021/0119411 A1* 4/2021 Lochman .............. B23K 26/00
(Continued)

FOREIGN PATENT DOCUMENTS

CN 111430385 A 7/2020
CN 114641863 A 6/2022
DE 102017111802 A1 * 12/2018 .............. H10F 1/00
(Continued)

OTHER PUBLICATIONS

TW Office Action Aug. 30, 2024, with the corresponding application No. TW 112140311.
(Continued)

*Primary Examiner* — Thanh Luu
*Assistant Examiner* — Mai Thi Ngoc Tran
(74) *Attorney, Agent, or Firm* — MUNCY, GEISSLER, OLDS & LOWE, P.C.

(57) ABSTRACT

An optical sensing device and a method for manufacturing the same are provided. The optical sensing device comprises a substrate, an optical acting area, a filter layer and a carbonized sidewall. The optical acting area is disposed on the substrate. The filter layer covers the optical acting area and selectively allows only a light beam with a specific wavelength to pass therethrough and be received by the optical acting area while blocking the light beams with other wavelengths. The carbonized sidewall covers the sidewall of the filter layer and a portion of the sidewall of the substrate to prevent the light beams with the other wavelengths from being received by the optical acting area through the sidewall of the substrate.

9 Claims, 4 Drawing Sheets

(56) References Cited

U.S. PATENT DOCUMENTS

2021/0144852 A1* 5/2021 Kurita ................ B29C 45/0001

FOREIGN PATENT DOCUMENTS

| | | | |
|---|---|---|---|
| JP | H04240782 | A | 8/1992 |
| JP | 2004071734 | A | 4/2004 |
| JP | 2013187357 | A | 9/2013 |
| TW | 201041186 | A1 | 11/2010 |
| TW | 201308615 | A | 2/2013 |
| TW | 201308664 | A1 | 2/2013 |
| TW | 201543695 | A | 11/2015 |

OTHER PUBLICATIONS

Extended European Search Report Application No. 24168733.4, Sep. 10, 2024, 7 pages.

* cited by examiner

OPTICAL SENSING DEVICE AND METHOD FOR MANUFACTURING THE SAME

CROSS-REFERENCES TO RELATED APPLICATIONS

This application claims the benefit of priority to Taiwanese Patent Application No. 112140311 filed on Oct. 20, 2023, which is hereby incorporated by reference in its entirety.

BACKGROUND OF THE INVENTION

Field of the Invention

The present invention relates to a light sensing device and a method for manufacturing the same, and in particular to a light sensing device for selectively allowing light with a specific wavelength to pass therethrough and a method for manufacturing the same.

Descriptions of the Related Art

A bandpass filter (BPF) is an optical device used to selectively allow light with a specific wavelength to pass therethrough while filtering out light with other wavelengths. This kind of filter is very useful in optical sensing devices because it can be used to separate and detect the wavelength or frequency of specific light in a certain area, and is therefore used in technical fields such as biomedical imaging and environmental monitoring.

The working principle of an optical bandpass filter is based on the interference and reflection of light, and it usually consists of a transparent substrate and a multi-layer thin film structure. These thin film layers are stacked alternately in different materials and have specific optical thicknesses to achieve high transmission for specific wavelengths and high reflectance for other wavelengths. When light irradiates the surface of the filter, it will enter the multi-layer thin film structure of the filter. At the material interface between the multi-layer film structures, the light will interfere and reflect. Since light with different wavelengths propagates at different speeds in different materials, interference between multi-layer thin film structures will cause the phases of light with certain wavelengths to be additive and enhanced, while the phases of light with other wavelengths to be destructive and weakened. With proper designs, the filter's multi-layer thin film structure can form a resonant cavity so that light with specific wavelengths can be enhanced, while light with other wavelengths can be reflected or absorbed. Thus, it allows the light beams with specific wavelengths to pass through the filter. This is the so-called "bandpass" effect.

However, although traditional sensing device uses bandpass filters to filter specific light wavelengths, in actual applications, some light will still enter the interior of the sensing device and a photocurrent will be generated at the photodiode interface to affect detection accuracy. In order to overcome the above problems, the industry urgently needs an innovative light sensing structure and a manufacturing method thereof to improve the above problems of poor wave filtering.

SUMMARY OF THE INVENTION

The main objective of the present invention is to provide a novel light sensing device and a method for manufacturing the same, aiming to address issues such as false signals caused by poor wave filtering and sensing accuracy reduction, of the conventional sensing devices.

To achieve the above objective, the present invention discloses an optical sensing device which comprises a substrate, an optical acting area, a filter layer and a carbonized sidewall. The optical acting area is disposed on the substrate. The filter layer covers the optical acting area and selectively allows only a light beam with a specific wavelength to pass therethrough and be received by the optical acting area while blocking the light beams with other wavelengths. The carbonized sidewall covers the sidewall of the filter layer and a portion of the sidewall of the substrate to prevent the light beams with the other wavelengths other than the specific wavelength from being received by the optical acting area through the sidewall of the substrate.

In one embodiment, the filter layer is a bandpass filter (BPF) layer.

In one embodiment, a depth of the carbonized sidewall is approximately less than ¼ of a thickness of the substrate.

In one embodiment, a depth of the carbonized sidewall ranges approximately from 40 micrometers (μm) to 50 micrometers (μm).

In one embodiment, the carbonized sidewall is formed by irradiating the sidewall of the filter layer and the portion of the sidewall of the substrate with a high-energy laser beam.

In one embodiment, the light beam with the specific wavelength is an ultraviolet light with a wavelength ranging approximately from 100 nanometers to 400 nanometers.

In one embodiment, the substrate is a silicon substrate.

To achieve the above objective, the present invention discloses a method for manufacturing an optical sensing device. The method comprises the following steps: providing a substrate; forming an optical acting area, disposed on the substrate; forming a filter layer, covering the optical acting area and selectively allowing only a light beam with a specific wavelength to pass therethrough and being received by the optical acting area while blocking the light beams with other wavelengths; and forming a carbonized sidewall, covering the sidewall of the filter layer and a portion of the sidewall of the substrate, wherein the carbonized sidewall may prevent the light beams with the other wavelengths other than the specific wavelength from being received by the optical acting area through the sidewall of the substrate.

In one embodiment, the step of forming the carbonized sidewall is to provide a high-energy laser beam to irradiate the sidewall of the filter layer and the portion of the sidewall of the substrate.

In one embodiment, the step of forming the carbonized sidewall is to form a depth of the carbonized sidewall approximately less than ¼ of a thickness of the substrate.

After referring to the drawings and the embodiments as described in the following, those the ordinary skilled in this art can understand other objectives of the present invention, as well as the technical means and embodiments of the present invention.

DETAILED DESCRIPTION OF THE PREFERRED EMBODIMENT

In the following description, the present invention will be explained with reference to various embodiments thereof. These embodiments of the present invention are not intended to limit the present invention to any specific environment, application or particular method for implementations described in these embodiments. Therefore, the description of these embodiments is for illustrative purposes only and is not intended to limit the present invention. It shall be appreciated that, in the following embodiments and the attached drawings, a part of elements not directly related to the present invention may be omitted from the illustration, and dimensional proportions among individual elements and the numbers of each element in the accompanying drawings are provided only for ease of understanding but not to limit the present invention.

Figure 1:
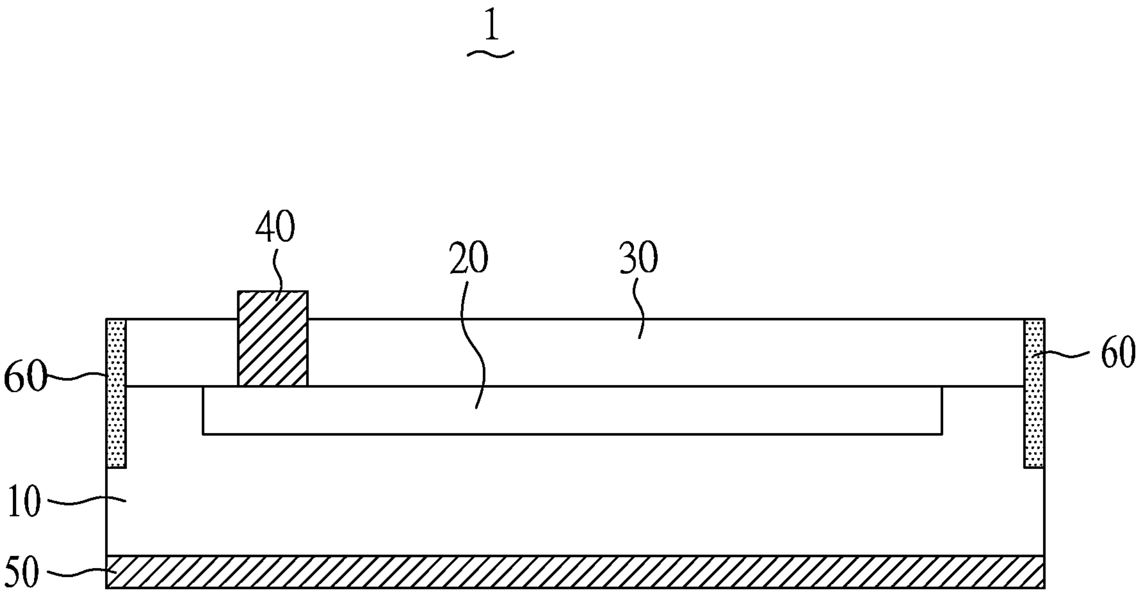
FIG. 1 illustrates a schematic diagram of the structure of the optical sensing device in one embodiment of the present invention.

Please refer to FIG. 1, which illustrates a schematic diagram of the structure of the optical sensing device in one embodiment of the present invention. As shown in the drawing, the optical sensing device 1 in this embodiment includes a substrate 10, an optical active area 20, a filter layer 30, an upper electrode 40, and a lower electrode 50. The substrate 10 serves as the bottom supporting material of the optical sensing device 1 and usually is made of optically transparent materials to allow light to pass through. The material of the substrate 10 is typically selected to have good light transmission properties, such as silicon, quartz, etc. In the embodiment of the present invention, a silicon substrate 10 with N-type dopants is used as the substrate material. As for the thickness of the substrate 10, it can be adjusted according to specific application requirements and designs, typically ranging from hundreds of micrometers (μm) to several millimeters (mm). In the embodiment of the present invention, the thickness of the silicon substrate 10 is approximately 400 micrometers, and its sheet resistance is approximately 0.008 to 0.0125 ohm-centimeters (Ω-cm).

Continuing with FIG. 1, the optical active area 20 includes a silicon photodiode structure and is disposed in the central area of the substrate 10 for serving as a portion for detecting light signals. Typically, it is a P/N photodiode structure used to receive light with specific wavelengths. Next, the filter layer 30 is a bandpass filter (BPF) layer covering the optical active area 20 for selectively allowing only light with a specific wavelength to pass through and being received by the optical active area 20 while blocking light with other wavelengths. In one embodiment of the present invention, the filter layer 30 only allows ultraviolet light with wavelengths ranging from approximately 100 nanometers (nm) to 400 nm to pass through and blocks light with other wavelengths, such as visible light and infrared light with wavelengths ranging from 400 nm to 1100 nm, to avoid absorption by the optical active area 20. The filter layer 30 is a multi-layer thin film structure. In the present invention, the filter layer 30 can be a composite layer comprising, but not limited to, tantalum pentoxide ($Ta_2O_5$) and silicon dioxide ($SiO_2$). The upper electrode 40 is disposed within the filter layer 30, while the lower electrode 50 is disposed on the back side of the substrate 10 used to apply an electric field to control the optical properties of the filter layer 30. By changing the voltage, the refractive index of the dielectric layer in the filter layer structure can be adjusted to modify the central wavelength or bandwidth of the filter.

One characteristic of the optical sensing device 1 of the present invention is the optical sensing device further comprises a carbonized sidewall 60, disposed on the sidewalls around the periphery of the filter layer 30 and a portion of the periphery of the substrate 10, to reduce interference from external side light on the optical active area 20. As shown in FIG. 1, the carbonized sidewall 60 is used to block external light, such as visible light or infrared light with wavelengths ranging from approximately 400 nanometers to 1100 nanometers, from entering the optical sensing device 1 through the sidewalls of the substrate 10 and the filter layer 30 and reaching the optical active area 20 for generating erroneous signals accordingly. In a preferred embodiment, the depth of the carbonized sidewall 60 is approximately less than ¼ of the thickness of the substrate 10, for example, ranging from 40 micrometers to 50 micrometers, and the width of the carbonized sidewall 60 is between 13 micrometers and 17 micrometers. However, these dimensions are not used to limit the invention. The actual depth and width of the carbonized sidewall 60 can be adjusted according to the range of the optical active area 20 within the optical sensing device 1 to effectively block external light from penetrating into the optical active area.

Figure 2:
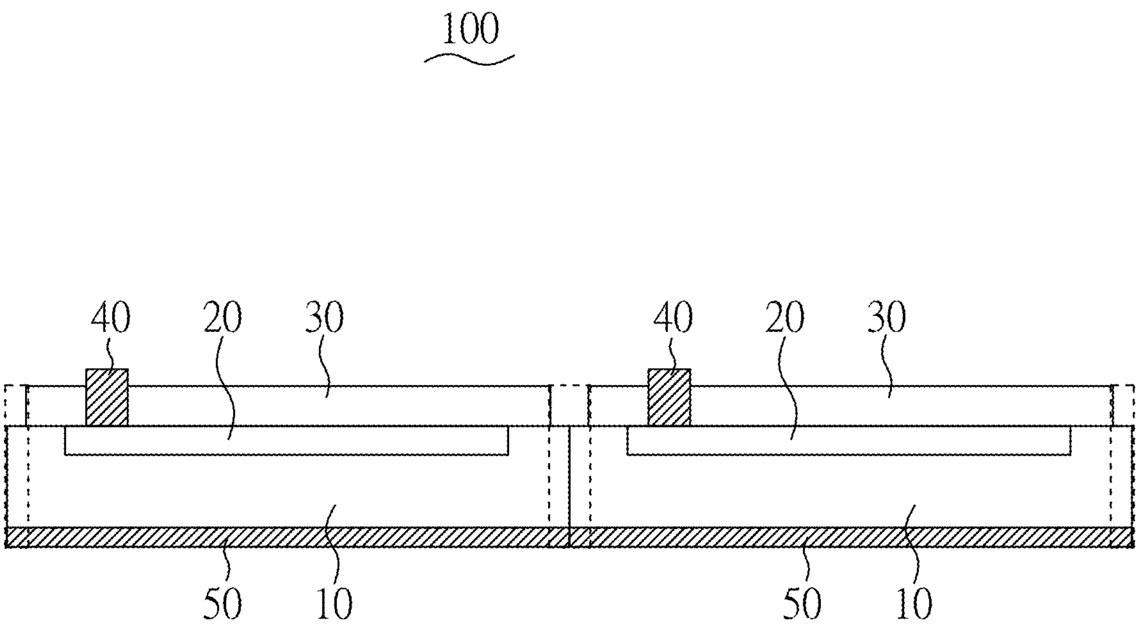
FIG. 2 illustrates a schematic diagram of manufacturing the optical sensing device in one embodiment of the present invention.
Figure 3:
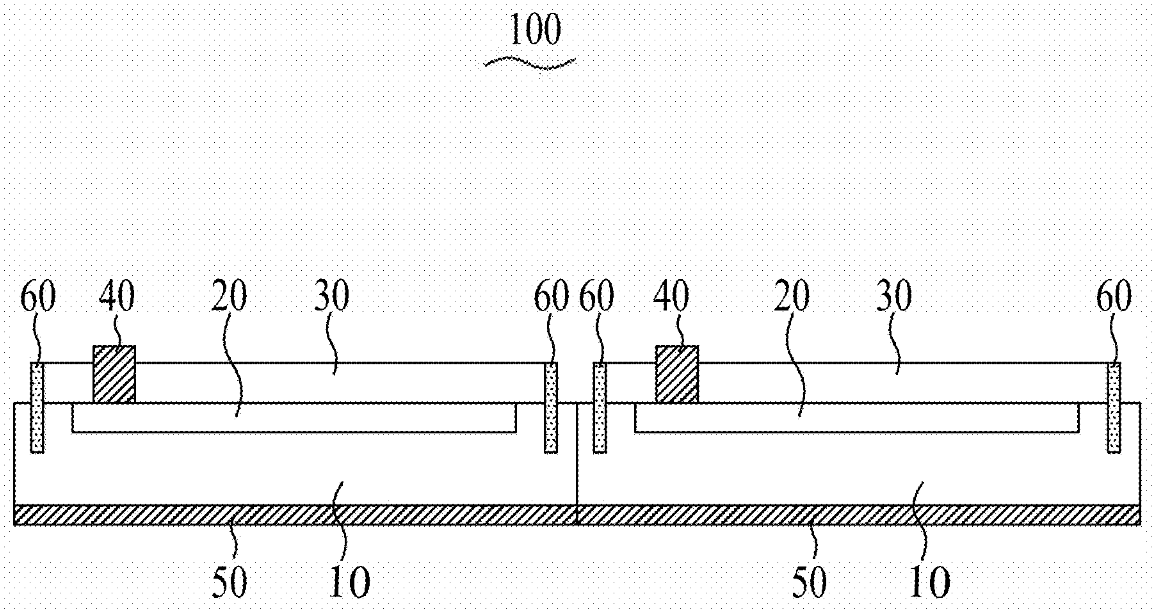
FIG. 3 illustrates a schematic diagram of manufacturing the optical sensing device in one embodiment of the present invention.

Please refer to FIG. 2 to FIG. 3 together, which illustrate the process steps for manufacturing the optical sensing device in one embodiment of the present invention. In FIG. 2, it shows a partial schematic diagram of a wafer 100 before being divided. Several partial structures of optical sensing devices 1 before being divided are already existed on this wafer 100, including the substrate 10, the optical active area 20, the filter layer 30, the upper electrode 40, and the lower electrode 50. The functions of each component are as described earlier and will not be reiterated here. Before the wafer 100 is divided, the areas between each optical sensing device are considered non-functional regions, as indicated by the dashed lines in FIG. 2. Subsequent processing for division will be conducted in these non-functional regions.

Figure 4:
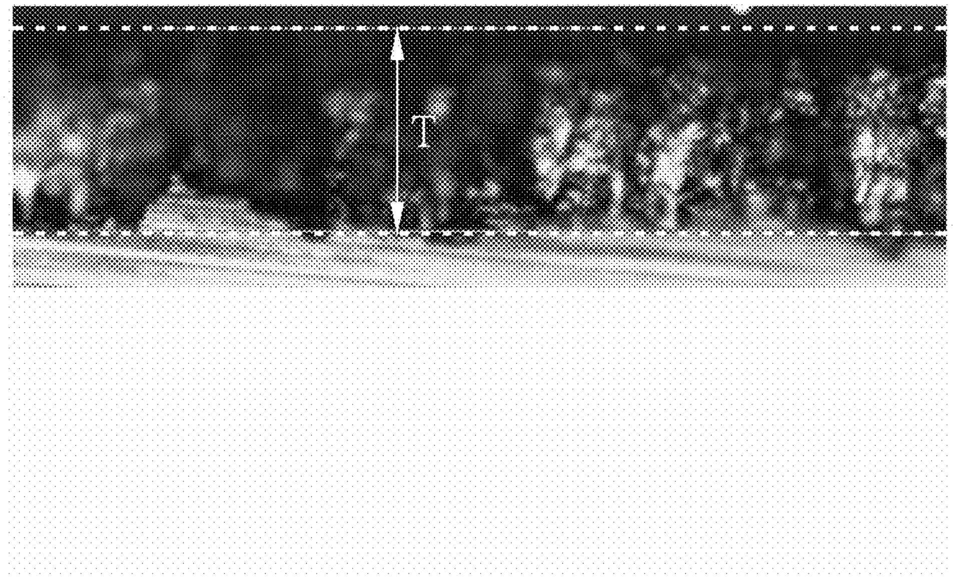
FIG. 4 illustrates a scanning electron microscope magnified image of the carbonized sidewall in one embodiment of the present invention.

Please refer to FIG. 3. In this step, a high-energy laser beam will be used to irradiate the non-functional regions between each optical sensing device. The laser beam will focus its energy on the sidewalls of the filter layer 30 and a portion of the sidewalls of the substrate 10 for causing carbonization thereof. Thereby, carbonized sidewalls 60 on the sidewalls of the filter layer 30 and a portion of the sidewalls of the substrate 10 will be formed for achieving the effect of blocking visible light and infrared light by the melted and carbonized structures. In practical applications, a high-energy laser is used for secondary laser cutting in the non-functional regions to form carbonized sidewalls 60 with a depth less than ¼ of the substrate thickness, for example, ranging from 40 micrometers to 50 micrometers, and a width between 13 micrometers and 17 micrometers. As shown in FIG. 4, it shows a scanning electron microscope magnified image of the carbonized sidewalls on the periphery of the filter layer and the substrate in the optical sensing device of the present invention. The thickness T between the dashed lines in the drawing is approximately 42 micrometers. After laser processing is completed, the wafer 100 is finally cut using a dicing saw to form several final structures of optical sensing devices 1 as shown in FIG. 1.

In summary, the optical sensing device of the present invention utilizes high-energy laser to form carbonized sidewall structures on the sidewalls of the optical sensing device for blocking external light, especially visible light and infrared light, from entering the interior through the sidewalls without causing any erroneous signals. It only allows light with ultraviolet wavelength range to penetrate into the device. Thereby, the accuracy of detection of the optical sensing device will be improved accordingly.

The above embodiments are used only to illustrate the implementations of the present invention and to explain the technical features of the present invention, and are not used to limit the scope of the present invention. Any modifications or equivalent arrangements that can be easily accomplished by people skilled in the art are considered to fall within the scope of the present invention, and the scope of the present invention should be limited by the claims of the patent application.

What is claimed is:

1. An optical sensing device, comprising:

a substrate;

an optical acting area, disposed on the substrate;

a filter layer, covering the optical acting area and selectively allowing only light beams with a specific wavelength to pass therethrough and being received by the optical acting area while blocking light beams with other wavelengths; and a carbonized sidewall, covering a sidewall of the filter layer and a portion of a sidewall of the substrate, wherein the carbonized sidewall prevents the light beams with the other wavelengths from being received by the optical acting area through the sidewall of the substrate, and wherein the carbonized sidewall is a melted and carbonized structure formed by irradiating the sidewall of the filter layer and the portion of the sidewall of the substrate with a high-energy laser beam.

2. The optical sensing device of claim 1, wherein the filter layer is a bandpass filter (BPF) layer.

3. The optical sensing device of claim 1, wherein a depth of the carbonized sidewall is approximately less than ¼ of a thickness of the substrate.

4. The optical sensing device of claim 1, wherein a depth of the carbonized sidewall ranges approximately from 40 micrometers (μm) to 50 micrometers (μm).

5. The optical sensing device of claim 1, wherein the light beams with the specific wavelength are an ultraviolet light with wavelengths ranging approximately from 100 nanometers to 400 nanometers.

6. The optical sensing device of claim 1, wherein the substrate is a silicon substrate.

7. A method for manufacturing an optical sensing device, comprising:

providing a substrate;

forming an optical acting area, disposed on the substrate;

forming a filter layer, covering the optical acting area and selectively allowing only light beams with a specific wavelength to pass therethrough and being received by the optical acting area while blocking light beams with other wavelengths; and forming a carbonized sidewall, covering a sidewall of the filter layer and a portion of a sidewall of the substrate by irradiating the sidewall of the filter layer and the portion of the sidewall of the substrate with a high-energy laser beam such that the sidewall of the filter layer and the portion of the substrate are melted and carbonized, wherein the carbonized sidewall prevents the light beams with the other wavelengths from being received by the optical acting area through the sidewall of the substrate.

8. The method for manufacturing an optical sensing device of claim 7, wherein the step of forming the carbonized sidewall is to provide a high-energy laser beam to irradiate the sidewall of the filter layer and the portion of the sidewall of the substrate.

9. The method for manufacturing an optical sensing device of claim 8, wherein the step of forming the carbonized sidewall is to form a depth of the carbonized sidewall approximately less than ¼ of a thickness of the substrate.

* * * * *